United States Patent
Rud

(10) Patent No.: US 9,488,527 B2
(45) Date of Patent: Nov. 8, 2016

(54) PROCESS TEMPERATURE MEASUREMENT USING INFRARED DETECTOR

(71) Applicant: Rosemount Inc., Chanhassen, MN (US)

(72) Inventor: Jason Harold Rud, Mayer, MN (US)

(73) Assignee: Rosemount Inc., Chanhassen, MN (US)

( * ) Notice: Subject to any disclaimer, the term of this patent is extended or adjusted under 35 U.S.C. 154(b) by 18 days.

(21) Appl. No.: 14/224,858

(22) Filed: Mar. 25, 2014

(65) Prior Publication Data

US 2015/0276492 A1    Oct. 1, 2015

(51) Int. Cl.
| | |
|---|---|
| G01J 5/08 | (2006.01) |
| G01J 5/12 | (2006.01) |
| G01J 5/00 | (2006.01) |
| G01J 5/02 | (2006.01) |

(52) U.S. Cl.
CPC ............. *G01J 5/12* (2013.01); *G01J 5/0014* (2013.01); *G01J 5/0037* (2013.01); *G01J 5/0044* (2013.01); *G01J 5/025* (2013.01); *G01J 5/0295* (2013.01); *G01J 5/0846* (2013.01); *G01J 2005/0048* (2013.01)

(58) Field of Classification Search
CPC ...... G01J 5/0044; G01J 5/0037; G01J 5/004; G01J 5/0014; G01J 5/12
See application file for complete search history.

(56) References Cited

U.S. PATENT DOCUMENTS

| | | | |
|---|---|---|---|
| 4,900,161 A | 2/1990 | Wolf et al. | |
| 5,109,277 A * | 4/1992 | James | 348/165 |
| 5,292,195 A | 3/1994 | Crisman, Jr. | |
| 5,654,977 A | 8/1997 | Morris | |
| 6,059,453 A | 5/2000 | Kempf et al. | |
| 6,461,573 B1 * | 10/2002 | Yamamoto et al. | 422/109 |
| 7,407,323 B2 | 8/2008 | Hutcherson | |
| 7,409,867 B2 | 8/2008 | Toy et al. | |
| 7,680,460 B2 | 3/2010 | Nelson et al. | |
| 8,538,560 B2 | 9/2013 | Brown et al. | |
| 2001/0042834 A1 | 11/2001 | Kenway | |
| 2005/0164684 A1 | 7/2005 | Chen et al. | |
| 2005/0220331 A1 | 10/2005 | Kychakoff et al. | |
| 2006/0026971 A1 | 2/2006 | Sharpe | |

(Continued)

FOREIGN PATENT DOCUMENTS

| | | |
|---|---|---|
| TW | I220364 | 8/2004 |
| WO | WO 2004/011935 | 2/2004 |

(Continued)

OTHER PUBLICATIONS

Notification of Transmittal of the International Search Report and the Written Opinion of the International Searching Authority, PCT/US2014/051432, dated Jan. 12, 2015.

(Continued)

*Primary Examiner* — Casey Bryant
(74) *Attorney, Agent, or Firm* — Westman, Champlin & Koehler, P.A.

(57) ABSTRACT

A process variable transmitter for measuring a temperature in an industrial process includes an infrared detector arranged to receive infrared radiation from a component in the industrial process. A memory contains temperature characterization information which relates the infrared radiation received from the component with an internal temperature of the component. Measurement circuitry is configured to determine the internal temperature of the component based upon the received infrared radiation from the component and the temperature characterization information.

15 Claims, 4 Drawing Sheets

(56) References Cited

U.S. PATENT DOCUMENTS

| | | | |
|---|---|---|---|
| 2006/0092153 A1 | 5/2006 | Chu et al. | |
| 2006/0278827 A1 | 12/2006 | Sierra et al. | |
| 2007/0019077 A1 | 1/2007 | Park | |
| 2007/0052804 A1 | 3/2007 | Money et al. | |
| 2007/0073439 A1 | 3/2007 | Habibi et al. | |
| 2009/0078047 A1* | 3/2009 | Dam | 73/606 |
| 2009/0285259 A1 | 11/2009 | Allen et al. | |
| 2010/0220180 A1 | 9/2010 | Lee et al. | |
| 2012/0025081 A1 | 2/2012 | Rapp et al. | |
| 2012/0161958 A1 | 6/2012 | Turon et al. | |
| 2013/0176418 A1 | 7/2013 | Pandey et al. | |
| 2013/0294478 A1 | 11/2013 | Puroll et al. | |
| 2014/0003465 A1 | 1/2014 | Elke | |
| 2014/0128118 A1 | 5/2014 | Tomimatsu et al. | |

FOREIGN PATENT DOCUMENTS

| | | |
|---|---|---|
| WO | WO 2008/136752 | 11/2008 |
| WO | WO 2009/074708 | 6/2009 |
| WO | WO 2011/004020 | 2/2011 |
| WO | WO 2011/137264 | 11/2011 |
| WO | WO 2013/006307 | 1/2013 |
| WO | WO 2013/009715 | 1/2013 |

OTHER PUBLICATIONS

Invitation to Pay Additional Fees, PCT/US2014/051628, dated Nov. 25, 2014.
Notification of Transmittal of the International Search Report and the Written Opinion of the International Searching Authority, PCT/US2014/069968, dated Mar. 19, 2015.
Notification of Transmittal of the International Search Report and the Written Opinion of the International Searching Authority, PCT/US2014/051628, dated Apr. 13, 2015.
Notification of Transmittal of the International Search Report and the Written Opinion of the International Searching Authority, PCT/US2014/051625, dated Oct. 23, 2014.
First Correct Notification for Chinese Patent Application No. 201420426405.7, dated Oct. 31, 2014, 4 pages.
DF-TV7-T, Multi-Spectrum 3IR Flame Detector, Groveley Detection Ltd., 2 pgs. no date.
DF-TV7-V, Combined UV/2IR Flame Detector, Groveley Detection Ltd., 2 pgs. no date.
FDS301, Visual Flame Detector FDS301, Groveley Detection Ltd., 2 pgs. no date.
Hardesty, Larry. (MIT News Office). MIT News "Researchers amplify variations in video, making the invisible visible," dated Jun. 22, 2012, 3 pgs. Found at http://web.mit.edu/newsoffice/2012/amplifying-invisible-video-0622.html.
Office Action from U.S. Appl. No. 14/224,814, dated Jul. 8, 2015.
Notification of Transmittal of the International Search Report and the Written Opinion of the International Searching Authority, PCT/US2015/011958, dated May 18, 2015.
"Integrated Wireless Gas Detection Solution", www.gassecure.com, Jun. 2014, 2 pgs.
"GS01 Wireless Gas Detector", www.gassecure.com, Jun. 2014, 2 pgs.
Notification of Transmittal of the International Search Report and the Written Opinion of the International Searching Authority, PCT/US2015/040310, dated Nov. 11, 2015.
Final Office Action from U.S. Appl. No. 14/224,814, dated Feb. 1, 2016.

* cited by examiner

PROCESS TEMPERATURE MEASUREMENT USING INFRARED DETECTOR

BACKGROUND

The present invention relates to industrial process control and monitoring systems. More specifically, the present invention relates to measurement of temperature in an industrial process.

Industrial processes are used in the manufacture and movement of various process fluids as well as other activities including generation of power. In such installations, process variable transmitters are used to measure process variables of a process fluid such as flow, level, pressure, temperature, etc. To measure a temperature in an industrial process, a temperature sensor is typically thermally coupled to a process fluid or component in the industrial process. An electrical characteristic of the temperature sensor changes based upon the temperature of the sensor. This change in the electrical characteristic can be correlated with temperature. However, there are some industrial processes in which the temperature is so great that the life of a temperature sensor is greatly reduced. Further, temperature sensors may be exposed to process materials which may eventually cause the temperature sensor to degrade or completely fail. In such instances, replacement of the temperature sensor is required which may lead to significant down time of the industrial process.

SUMMARY

A process variable transmitter for measuring a temperature in an industrial process includes an infrared detector arranged to receive infrared radiation from a component in the industrial process. A memory contains temperature characterization information which relates the infrared radiation received from the component with an internal temperature of the component. Measurement circuitry is configured to determine the internal temperature of the component based upon the received infrared radiation from the component and the temperature characterization information.

DETAILED DESCRIPTION OF ILLUSTRATIVE EMBODIMENTS

As discussed in the Background section, excessive temperatures in industrial processes can damage or greatly reduce the lifetime and accuracy of temperature sensors. For example, in a heavy feed stock gasification process, thermocouples are typically used as temperature sensors for start-up and run time purposes. However, these sensors may experience temperatures as high as 2000° C. which will cause damage to the sensors and even complete failure within a very short time. In addition to excessive temperatures, heavy materials in the process such as coal and petcoke can also cause damage to temperature sensors. Techniques are known which can be used to protect a thermocouple temperature sensor from the process environment. One such technique is shown in U.S. Pat. No. 6,059,453, issued May 9, 2000, entitled TEMPERATURE PROBE WITH SAPPHIRE THERMOWELL in which a temperature sensor is protected from the process environment by a sapphire encasement. However, even with such protection the lifetime of a temperature sensor may be less than four months due to the heavy materials in the process which contact the sapphire encasement. In one aspect, the present invention addresses these problems by using a technique for remotely measuring a temperature in the industrial process. For example, an infrared detector can be used to monitor infrared radiation emanating from external walls or surfaces of a process vessel such as gasification reactor vessel and used to determine internal temperature as explained below in greater detail.

Figure 1:
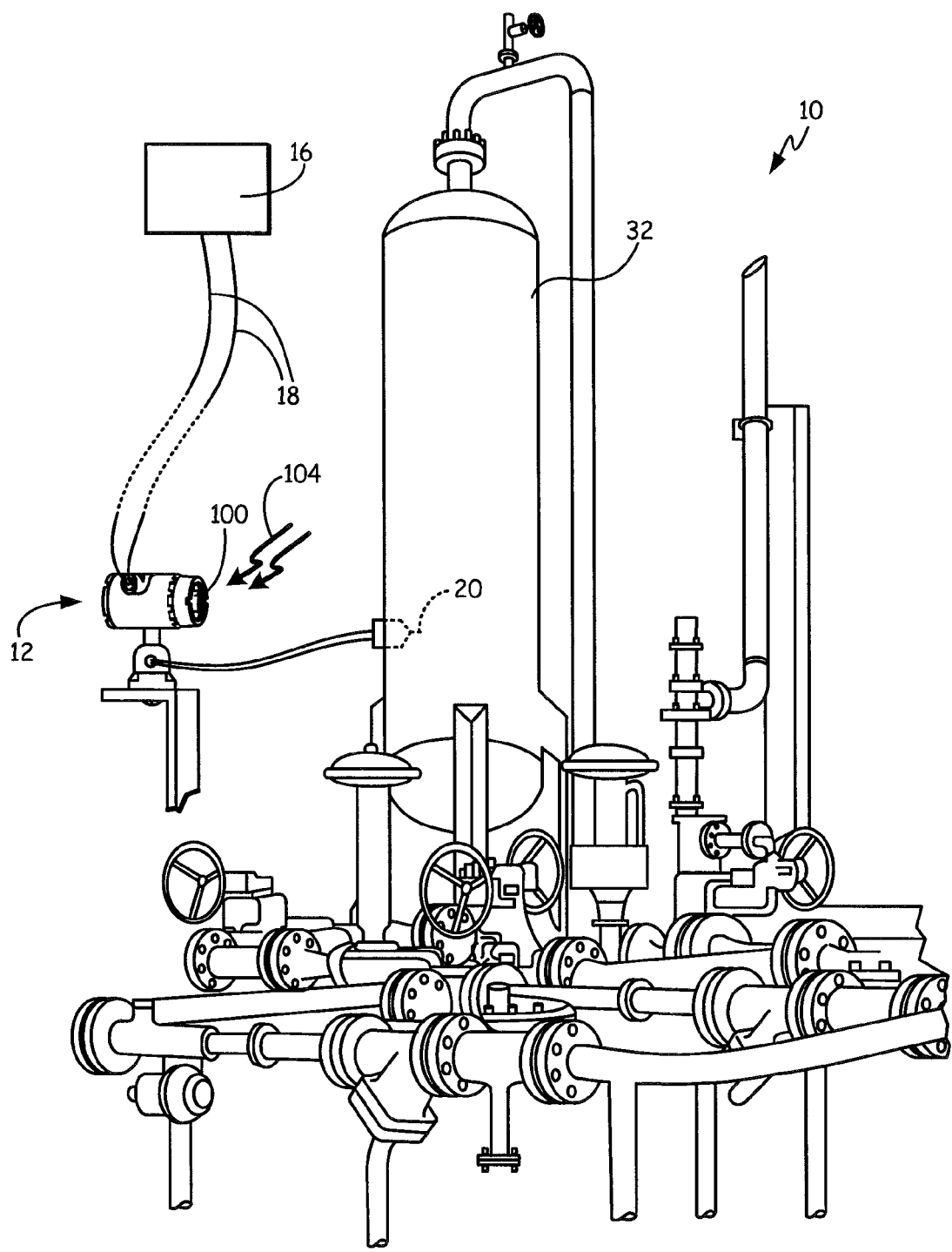
FIG. 1 is a simplified diagram showing an industrial process including a process variable transmitter having an infrared detector for measuring a temperature of the industrial process.

FIG. 1 is a simplified diagram showing an industrial process 10 which includes a process variable transmitter 12 for use in measuring a temperature of the industrial process and illustrates one example embodiment of the invention. Transmitter 12 communicates with another location such as process control room 16 over a two-wire process control loop 18. For example, loop 18 can comprise current loop that can also be used to power transmitter 12. Data can be carried on loop 18 in accordance with any appropriate protocol, for example, an analog current level which varies between 4 and 20 mA, the HART® communication protocol in which digital information is modulated on to a 4-20 mA current, the Foundation Fieldbus or Profibus communication protocols, etc. Process control loop 18 may also be implemented using wireless communication techniques. One example of wireless communication technique is the WirelessHART® communication protocol in accordance with IEC 62591. Standard Ethernet, fiberoptic connections, or other communication channels may also be used to implement loop 18.

As illustrated in FIG. 1, transmitter 12 includes an infrared detector 100 configured to receive infrared radiation 104, for example, from a surface of a reactor vessel 32. Reactor vessel 32 may comprise, for example, a process vessel used in the gasification of coal, a nuclear reactor, a conduit or container, or other vessel used in an industrial process which experiences high temperature during use. Transmitter 12 connects to an optional temperature sensor 20 which is arranged to directly measure a temperature of the industrial process, for example, process fluid carried within the reactor vessel 32. Optional temperature sensor 20 can be used to perform an initial characterization of a temperature profile of the reactor vessel 32 as discussed below in more detail. Temperature sensor 20 can comprise, for example, a thermocouple, RTD or other temperature sensor.

Figure 2:
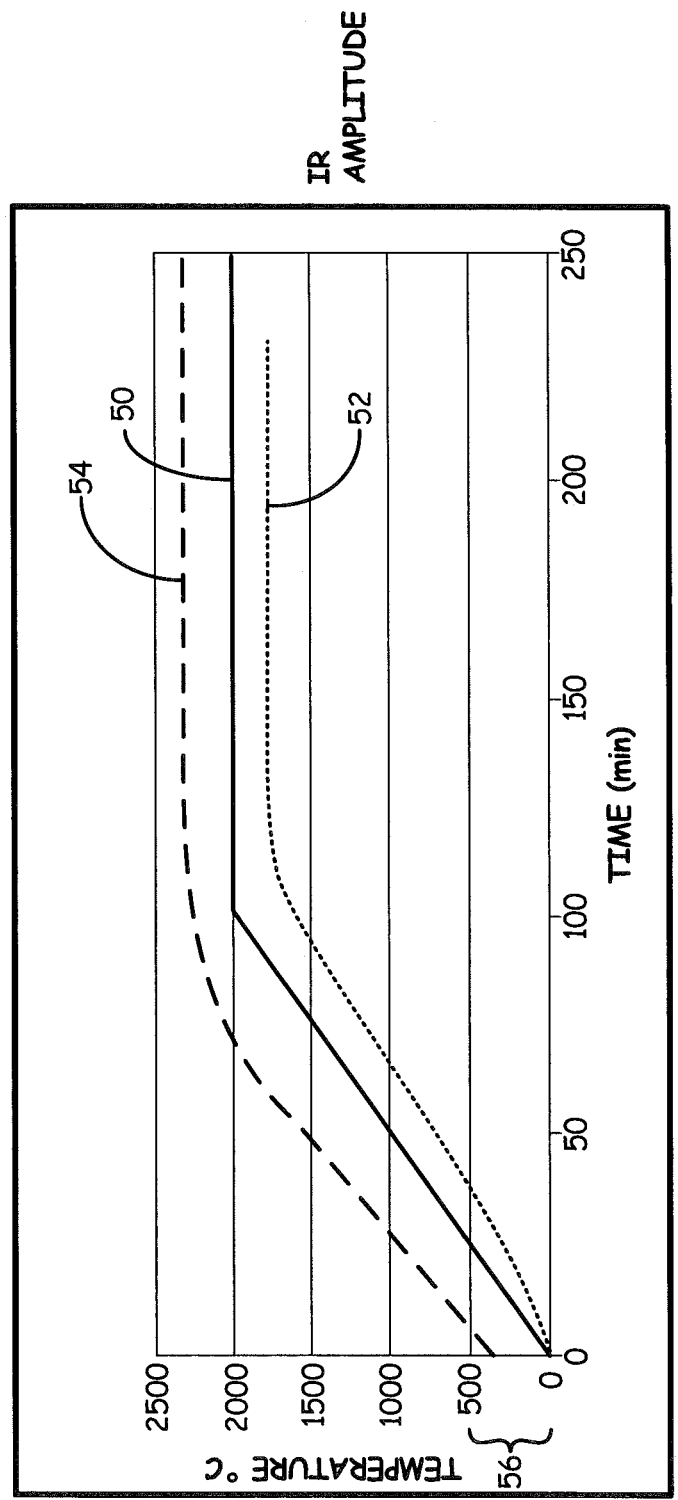
FIG. 2 is a graph illustrating temperature and infrared amplitude versus time.

As illustrated in FIG. 1, transmitter 12 includes an infrared detector 100 configured to remotely monitor the infrared radiation 104 emanating from a process surface, for example external walls, of the reactor vessel 32. The sensed infrared radiation can be correlated with the internal temperature of the reactor vessel 32. During start-up of the process 10, a characterization can be performed in which the temperature sensed by the temperature sensor 20 is correlated with the sensed radiation 104 emitted from the external surface of reactor vessel 32. For example, FIG. 2 is a graph which illustrates the internal temperature 50 in the reactor vessel 32, the external surface temperature 52 of an external surface of the reactor vessel 32 and the amplitude 54 of the infrared radiation emitted from the external surface of reactor vessel 32 versus time during a start-up procedure. Note that the infrared radiation amplitude 54 may include an initial offset amount 56 due to the ambient temperature and initial starting temperature of the reactor vessel 32. As illustrated in FIG. 2, the infrared amplitude 54 is related to the internal temperature of the reactor vessel 32. Based upon this relationship, a correlation may be developed between the internal temperature of the reactor vessel 32 and the sensed radiation. An optional ambient temperature sensor 40 (shown in FIG. 3) may also be used in this correlation to compensate for the effects of ambient temperature in the sensed infrared radiation 104. This correlation may take into account differences in the rate of change, damping characteristics, steady state offset, as well as ambient temperature which may change the way in which the sensed radiation 104 relates to the internal temperature. The specific characteristics of this correlation may be learned empirically by directly measuring the process temperature during initial start-up of the process using sensor 20. Once these characteristics have been learned, infrared measurements can be processed and compensation can be automatically applied by the transmitter 12. This characterization process can be performed automatically and does not require significant interaction by an operator. In general, as shown in FIG. 2, the temperature of reactor vessel 32 is related to the amplitude of the infrared radiation. However, the transmitter 12 may also operate based upon the wavelength of the infrared radiation. In some configurations, it may also be desirable to tune the sensor 100 for sensitivity to a particular infrared spectrum.

If an optional temperature sensor 20 is employed direct temperature measurements may be obtained using this sensor 20. These direct temperature measurements may continue until the sensor 20 ultimately fails or a large discrepancy arises between temperature measurements obtaining using sensor 20 and those obtained using the infrared detector 100. Further, during the period that temperature sensor 20 is operational, this additional information can be used to perform diagnostics on the system. Such diagnostics include observing differences between the measurements from the two sensors, noting variations and patterns which are present in the measurements from only one of the two sensors or other techniques in which the measurements from the two sensors are compared.

Figure 3:
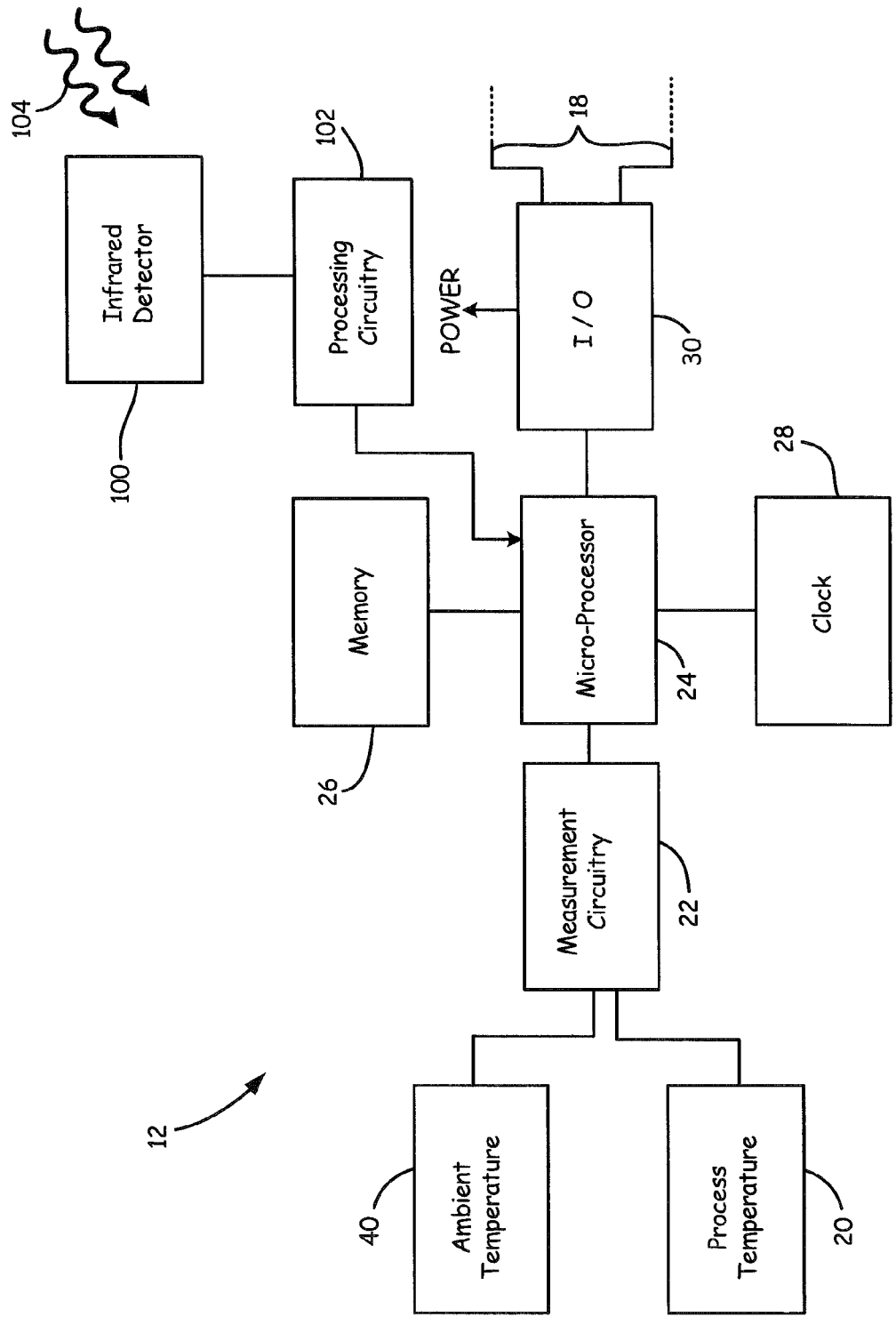
FIG. 3 is a simplified block diagram showing components of the process variable transmitter of FIG. 1.

FIG. 3 is a simplified block diagram of process variable transmitter 12 and illustrates the infrared detector 100, the optional process temperature sensor 20 and an ambient temperature sensor 40. Transmitter 12 includes a microprocessor 24 which operates in accordance with instructions stored in memory 26 at a rate determined by clock 28. Communication circuitry (I/O) 30 is used for communicating on the process control loop 18. In some embodiments, circuitry 30 also provides power to transmitter 12 received over process control loop 18. As illustrated in FIG. 3, the output from the infrared detector 100 is provided to processing circuitry 102 which may perform, for example, amplification on the detected infrared signal, digitization of the signal, compensation, filtering, etc. The digitized output is provided to the microprocessor 24. Further, microprocessor 24 measures the internal temperature of the vessel 32 using optional process temperature sensor 20. An optional ambient temperature sensor 40 is also illustrated and can be used to measure the ambient temperature in the process environment for compensation of the temperature measurement made using infrared signal 104.

Figure 4:
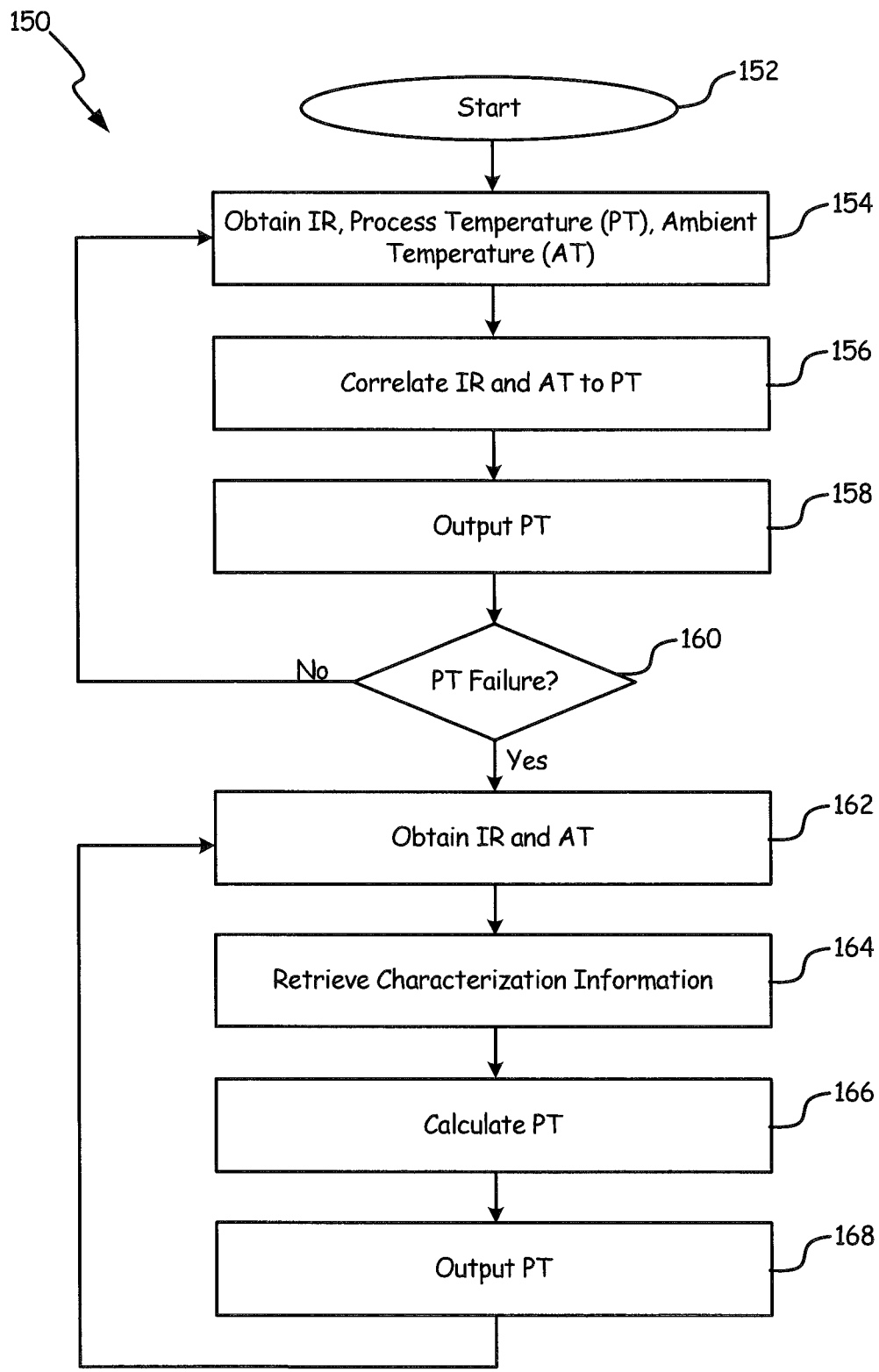
FIG. 4 is a simplified block diagram showing steps which can be implemented by the process variable transmitter illustrated in FIG. 3 in accordance with one example embodiment.

FIG. 4 is a simple block diagram of example steps 150 in accordance with one embodiment. The steps 150 illustrated in FIG. 4 can be implemented, for example, using microprocessor 24 based upon instructions stored in memory 26 shown in FIG. 3. In FIG. 4, the process begins at a start block 152 which can be initiated, for example during a process start-up qualification process. At block 154, values for the received infrared radiation 104, the measured process temperature using temperature sensor 20, and the measured ambient temperature using ambient temperature sensor 40 are obtained. At block 156, the measured infrared and ambient temperatures are correlated with the measured process temperature value. For example, this correlation can be performed using curve fitting techniques in which coefficients of polynomial equations are determined. These coefficients can be stored in the memory 26. Higher order polynomial equations can be utilized to provide more accurate results. At block 158, the measured process temperature from sensor 20 is provided as an output, for example, over the process control loop 18. At block 160, the condition of the process temperature sensor 20 is evaluated. For example, a failure can be detected if an open circuit condition is measured, the sensor has elevated impedance or erratic behavior is observed. If the sensor 20 has not failed, control can be returned to block 154 and the characterization and measurement process continues. Block 154-160 operate as a characterization (or learning) phase. The characterization phase can include timing information to account for delays as the exterior surface of the reactor 32 reaches an equilibrium with respect to the internal temperature. Note that during this phase, direct temperature measurements are obtained using the process temperature sensor 20 and therefore process temperature does not need to be inferred using the measured infrared radiation. The characterization phase may continue until the process temperature sensor 20 fails, based upon a predetermined time period, a combination of both failure or time period expiration, or some other trigger.

If the process temperature sensor 20 fails, or if for some other reason the compensation phase is exited, control is passed to block 162. At block 162, infrared radiation is measured using infrared detector 100 as well as the ambient temperature using ambient temperature sensor 40. At block 164, the characterization information (such as polynomial coefficients) that was stored in memory 26 is retrieved. Based upon this characterization information, the process temperature is calculated as a function of the measured infrared radiation and the sensed ambient temperature values. At block 168, the calculated process temperature is output, for example on the process control loop 18. Control can then be returned to block 162 and the process continued.

As discussed above, the use of ambient temperature in process temperature determination is optional. However, measurement of ambient temperature can be used to increase the accuracy of the estimation of the internal process temperature. Further, the invention is not limited to the use of ambient temperature and any additional process variable can be used in process temperature determination. Other process variable inputs may be used including additional temperature inputs, inputs related to flow or other process conditions, information related to the type of fluid within a process vessel or the particular process steps which are being performed, etc. Other information which can be used to characterize the received infrared radiation 104 include time of day information, time of year information, information related to weather conditions, information related to ambient infrared radiation, etc.

Any appropriate characterization technique can be used in the estimation of the internal process temperature. The above example describes curve fitting using polynomials. Another example configuration includes the use of a neural network or other self-learning algorithm. In such a configuration, a characterization algorithm is trained by observing normal operation. Increased accuracy of the neural network and temperature determination can be obtained by increasing the duration during which the trailing occurs. Other characterization techniques may also be employed including one-dimensional or multi-dimensional look-up tables, least squares fitting and interpolation techniques, spline fitting, etc. Further, this characterization process can be performed during manufacture of the device or at some other time and stored in the memory 26. In another example, standardized characterizations can be selected based upon the specifics of an installation configuration. This may be, for example, by selecting a particular type of configuration of a process vessel 32 being monitored, the distance between the process vessel and the microwave sensor 100, particular characteristics of the vessel such as wall thickness and thermal conductivity, etc. In such a configuration, predetermined characterization information can be stored in the memory 26. During commissioning of the process variable transmitter 12, an operator can select from the predetermined characterization information based upon the specifies of the installation. Increased accuracy of the characterization can be obtained by increasing the amount of information which can be selected by an operator to provide a more specific modeling of the actual installation. This characterization selection process may be performed by an operator using a local operator interface (LOI), by communicating over the process control loop 18, or through some other means.

Although the present invention has been described with reference to preferred embodiments, workers skilled in the art will recognize that changes may be made in form and detail without departing from the spirit and scope of the invention. Although a reactor vessel is illustrated herein, the invention can be used with any process vessel including conduits, containers, components such as motors or heating elements, exhaust stacks, etc. The particular infrared sensing technology can be chosen as appropriate. A single element may be employed and configured to operate as a spot sensor, or more complex devices can be used such as an array or the like. More accurate temperature measurements may be obtained by monitoring infrared radiation from multiple locations across the surface of the process vessel 32 or across multiple process components. These may be combined using weighting techniques or other curve fitting techniques as discussed above. The calibration or characterization phase of operation can be triggered based upon start-up of the system or based upon receipt of a command, for example from a process control loop, or through some other initiation. For example, characterization can occur upon the detection of an operable temperature sensor coupled to the process. The temperature sensors 20 and 40 may communicate with the process variable transmitter 12 using any appropriate technique including a localized bus, direct analog wiring, an extended network including a separate process control loop, a wireless connection, etc. For example, ambient temperature information can be provided from another location, such as a control room. In one example, additional temperature sensor information is used to perform diagnostics. For example, variations of the temperature which is sensed directly or the ambient temperature and the temperature determined based upon in the received infrared radiation may be related to a diagnostic condition in the process. The infrared radiation may be from any source and typically emanates from a surface of a component in the industrial process. The positioning and direction of the radiation detector should be selected as desired. Preferable the infrared radiation detector is spaced sufficiently far from any heat source so that it is not damaged. Further, improved accuracy can be obtained by ensuring that the infrared radiation detector has an unobstructed view of the process vessel. The accuracy of the temperature determination can be improved by using an infrared radiation detector that is sufficiently directional so that only radiation from the process vessel of interest is received. Shielding can be used around some or all of the perimeter of the infrared radiation detector to act as a blinder to block infrared radiation from other sources.

What is claimed is:

1. A process variable transmitter for measuring a process temperature in an industrial process, comprising:
    an infrared detector arranged to receive infrared radiation from a process component in the industrial process;
    a memory containing temperature characterization information which relates the infrared radiation received from the process component with an internal temperature of the process component;
    a temperature sensor located internal to the process component;
    measurement circuitry configured to infer the internal temperature of the process component based upon the received infrared radiation from the surface of the process component and the temperature characterization information; and
    wherein the measurement circuitry operates in a characterization phase to generate the characterization information based upon a relationship between a temperature sensed by the temperature sensor and radiation received by the infrared detector.

2. The process variable transmitter of claim 1, wherein the characterization information comprises polynomial coefficients.

3. The process variable transmitter of claim 1, wherein the characterization phase is entered during startup of the industrial process.

4. The process variable transmitter of claim 1, wherein the measurement circuitry operates in the characterization phase until the temperature sensor fails.

5. The process variable transmitter of claim 1, wherein the measurement circuitry enters the characterization phase in response to a command.

6. The process variable transmitter of claim 1, wherein the process component comprises a process vessel which contains process fluid.

7. The process variable transmitter of claim 1, wherein the characterization information is further a function of a trend in the received infrared radiation.

8. The process variable transmitter of claim 1, wherein the characterization information is stored in the memory during manufacture of the process variable transmitter.

9. The process variable transmitter of claim 1, wherein the characterization information is selectable by an operator.

10. The process variable transmitter of claim 1, including output circuitry configured to provide a determined temperature output on a process control loop.

11. The process variable transmitter of claim 1, wherein the internal temperature of the process component comprises temperature of a process fluid contained within the process component.

12. The process variable transmitter of claim 1, including an ambient temperature sensor and wherein the determined internal temperature is further a function of the ambient temperature.

13. The process variable transmitter of claim 12, wherein the characterization information includes characterization information related to the ambient temperature.

14. A method for measuring a temperature of a process fluid in an industrial process, comprising:
- receiving infrared radiation with an infrared radiation detector from a process component in the industrial process which carries the process fluid;
- placing a temperature sensor internal to the process component and in contact with the process fluid;
- determining temperature characterization information based upon a temperature sensed by the temperature from the temperature sensor and radiation received by the infrared radiation detector;
- retrieving the temperature characterization information from a memory, wherein the temperature characterization information relates the received infrared radiation to temperature of the process fluid;
- applying the temperature characterization information to the received infrared radiation and responsively inferring temperature of the process fluid; and
- providing an output related to the temperature of the process fluid.

15. The method of claim 14, including sensing an ambient temperature of the industrial process and wherein the temperature characterization information includes ambient temperature characterization information.

\* \* \* \* \*